United States Patent
Hori et al.

(10) Patent No.: US 10,716,029 B2
(45) Date of Patent: Jul. 14, 2020

(54) TERMINAL, BASE STATION, AND COMMUNICATION METHOD

(71) Applicant: Panasonic Intellectual Property Corporation of America, Torrance, CA (US)

(72) Inventors: Takako Hori, Kanagawa (JP); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/224,492

(22) Filed: Dec. 18, 2018

(65) Prior Publication Data

US 2019/0124550 A1 Apr. 25, 2019

Related U.S. Application Data

(63) Continuation of application No. PCT/JP2017/019456, filed on May 25, 2017.

(30) Foreign Application Priority Data

Aug. 12, 2016 (JP) .................... 2016-158839

(51) Int. Cl.
*H04W 28/06* (2009.01)
*H04L 29/06* (2006.01)
(Continued)

(52) U.S. Cl.
CPC .......... *H04W 28/06* (2013.01); *H04L 69/04* (2013.01); *H04L 69/24* (2013.01); *H04M 11/00* (2013.01);
(Continued)

(58) Field of Classification Search
CPC ....... H04W 28/06; H04W 4/00; H04W 8/245; H04W 28/0284; H04W 36/0055;
(Continued)

(56) References Cited

U.S. PATENT DOCUMENTS

2004/0117498 A1* 6/2004 Hashimoto ............... H04L 1/08
709/230
2005/0047340 A1* 3/2005 Babiarz ............. H04L 29/06027
370/231

(Continued)

FOREIGN PATENT DOCUMENTS

JP 2001-211443 A 8/2001
JP 2002-534874 A 10/2002
(Continued)

OTHER PUBLICATIONS

International Search Report of PCT application No. PCT/JP2017/019456 dated Jun. 27, 2017.
(Continued)

*Primary Examiner* — Jenee Holland
(74) *Attorney, Agent, or Firm* — Seed IP Law Group LLP

(57) ABSTRACT

A terminal includes: an application compatibility information acquirer that acquires first application compatibility information indicating an application with which a base station located on a channel of communication with a communication partner terminal is compatible; a utilized application negotiator that negotiates with the communication partner terminal about utilization of an application, included in applications with which the terminal is compatible, that matches the application indicated by the first application compatibility information; and a compression mode determiner that determines a compression mode on the basis of a result of negotiations about the application.

10 Claims, 13 Drawing Sheets

(51) Int. Cl.

| | | |
|---|---|---|
| *H04W 36/22* | (2009.01) | |
| *H04M 11/00* | (2006.01) | |
| *H04W 4/00* | (2018.01) | |
| *H04W 36/00* | (2009.01) | |
| *H04W 8/24* | (2009.01) | |
| *H04W 28/02* | (2009.01) | |
| *H04W 36/38* | (2009.01) | |
| *H04W 36/08* | (2009.01) | |

(52) U.S. Cl.
CPC ............. *H04W 4/00* (2013.01); *H04W 8/245* (2013.01); *H04W 28/0284* (2013.01); *H04W 36/0055* (2013.01); *H04W 36/22* (2013.01); *H04W 36/385* (2013.01); *H04W 36/08* (2013.01)

(58) Field of Classification Search
CPC .... H04W 36/22; H04W 36/385; H04L 69/04; H04L 69/24; H04M 11/00
See application file for complete search history.

(56) References Cited

U.S. PATENT DOCUMENTS

| | | | |
|---|---|---|---|
| 2006/0215576 A1* | 9/2006 | Yu | H04W 48/18 370/252 |
| 2008/0153496 A1 | 6/2008 | Fukuzawa et al. | |
| 2009/0010241 A1* | 1/2009 | Uchida | H04W 28/22 370/345 |
| 2009/0238164 A1* | 9/2009 | Yao | H04W 48/18 370/338 |
| 2009/0310509 A1* | 12/2009 | Kumai | H04W 48/18 370/254 |
| 2010/0103886 A1* | 4/2010 | Chun | H04L 1/0028 370/329 |
| 2011/0032935 A1* | 2/2011 | Yang | H04L 47/10 370/389 |
| 2011/0170410 A1* | 7/2011 | Zhao | H04L 47/10 370/232 |
| 2012/0076092 A1* | 3/2012 | Lu | H04W 28/18 370/329 |
| 2012/0142371 A1* | 6/2012 | Park | H04W 60/02 455/456.1 |
| 2012/0149404 A1* | 6/2012 | Beattie, Jr. | H04M 1/274508 455/466 |
| 2012/0182970 A1* | 7/2012 | Ding | H04W 36/14 370/331 |
| 2012/0224561 A1* | 9/2012 | Fang | H04W 76/10 370/331 |
| 2012/0243482 A1* | 9/2012 | Lu | H04W 28/18 370/328 |
| 2012/0307634 A1* | 12/2012 | Zhu | H04W 28/02 370/231 |
| 2013/0029716 A1* | 1/2013 | Lee | H04W 4/70 455/519 |
| 2013/0065585 A1 | 3/2013 | Pelletier et al. | |
| 2013/0194937 A1* | 8/2013 | Sridhar | H04L 47/24 370/252 |
| 2014/0029572 A1* | 1/2014 | Sayenko | H04W 36/0094 370/331 |
| 2014/0247781 A1* | 9/2014 | Somasundaram | H04W 4/70 370/329 |
| 2014/0313963 A1* | 10/2014 | Aust | H04W 52/0274 370/311 |
| 2015/0201411 A1* | 7/2015 | Shi | H04W 76/27 370/329 |
| 2015/0312319 A1* | 10/2015 | Wentink | H04W 16/08 370/329 |
| 2016/0142518 A1* | 5/2016 | Raina | H04L 69/04 370/230 |
| 2016/0142951 A1* | 5/2016 | Balasubramanian | H04W 36/023 370/331 |
| 2017/0064596 A1* | 3/2017 | Wang | H04W 28/06 |
| 2018/0027027 A1* | 1/2018 | Leung | H04L 65/403 709/206 |
| 2018/0103389 A1* | 4/2018 | Li | H04W 28/0215 |
| 2018/0367986 A1* | 12/2018 | Sundararajan | H04W 8/24 |
| 2019/0007464 A1* | 1/2019 | Hori | H04L 65/1069 |

FOREIGN PATENT DOCUMENTS

| | | |
|---|---|---|
| JP | 2006-237940 A | 9/2006 |
| JP | 2008-166871 A | 7/2008 |
| JP | 2015-507854 A | 3/2015 |
| WO | 2000/040053 A1 | 7/2000 |

OTHER PUBLICATIONS

3GPP TS 36.323 V13.2.1, "3rd Generation Partnership Project; Technical Specification Group Radio Access Network; Evolved Universal Terrestrial Radio Access (E-UTRA); Packet Data Convergence Protocol (PDCP) specification (Release 13)", Jun. 2016.
IETF RFC 3095, "RObust Header Compression (ROHC): Framework and four profiles: RTP, UDP, ESP, and uncompressed", Jul. 2001.
TSG-RAN WG2 Meeting #63, R2-084764, "LS on considerations on transport block sizes for VoIP", Aug. 2008.
3GPP TS 36.300 V13.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Jun. 2016.
3GPP TS 26.114 V14.0.0, "3rd Generation Partnership Project; Technical Specification Group Services and System Aspects; IP Multimedia Subsystem (IMS); Multimedia Telephony; Media handling and interaction (Release 14)", Jun. 2016.
IETF RFC 3168, "The Addition of Explicit Congestion Notification (ECN) to IP", Sep. 2001.
(3GPP TS 36.331 version 13.2.0 Release 13), "LTE; Evolved Universal Terrestrial Radio Access (E-UTRA); Radio Resource Control (RRC); Protocol specification", Aug. 2016.
3GPP TS 36.321 V13.2.0, "3rd Generation Partnership Project; Technical Specification Group Radio Access Network; Evolved Universal Terrestrial Radio Access (E-UTRA); Medium Access Control (MAC) protocol specification (Release 13)", Jun. 2016.
3GPP TS 23.401 V14.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 14)", Jun. 2016.
3GPP TR 26.980 V13.0.0, "3rd Generation Partnership Project; Technical Specification Group Services and System Aspects; Multimedia telephony over IP Multimedia Subsystem (IMS); Media handling aspects of multi-stream multiparty conferencing for Multimedia Telephony Service for IMS (MTSI) (Release 13)", Dec. 2015.
3GPP TR 23.799 V0.6.0, "3rd Generation Partnership Project; Technical Specification Group Services and System Aspects; Study on Architecture for Next Generation System (Release 14)", Jul. 2016.

* cited by examiner

FIG. 2A

```
Static part:
    +---+---+---+---+---+---+---+---+
    |  Version = 6  | Flow Label (msb) |    1 octet
    +---+---+---+---+---+---+---+---+
    /         Flow Label (lsb)        /    2 octets
    +---+---+---+---+---+---+---+---+
    |          Next Header            |    1 octet
    +---+---+---+---+---+---+---+---+
    /          Source Address         /   16 octets
    +---+---+---+---+---+---+---+---+
    /        Destination Address      /   16 octets
    +---+---+---+---+---+---+---+---+

Dynamic part:
    +---+---+---+---+---+---+---+---+
    |          Traffic Class          |    1 octet
    +---+---+---+---+---+---+---+---+
    |            Hop Limit            |    1 octet
    +---+---+---+---+---+---+---+---+
    /    Generic extension header list /   variable length
    +---+---+---+---+---+---+---+---+
```

FIG. 2B

```
Static part:
    +---+---+---+---+---+---+---+---+
    |  Version = 4  |        0       |
    +---+---+---+---+---+---+---+---+
    |            Protocol             |
    +---+---+---+---+---+---+---+---+
    /          Source Address         /    4 octets
    +---+---+---+---+---+---+---+---+
    /        Destination Address      /    4 octets
    +---+---+---+---+---+---+---+---+

Dynamic part:
    +---+---+---+---+---+---+---+---+
    |         Type of Service         |
    +---+---+---+---+---+---+---+---+
    |           Time to Live          |
    +---+---+---+---+---+---+---+---+
    /          Identification         /    2 octets
    +---+---+---+---+---+---+---+---+
    | DF |RND|NBO|         0          |
    +---+---+---+---+---+---+---+---+
    /    Generic extension header list /   variable length
    +---+---+---+---+---+---+---+---+
```

FIG. 2C

```
Static part:
    +---+---+---+---+---+---+---+---+
    /          Source Port          /    2 octets
    +---+---+---+---+---+---+---+---+
    /        Destination Port       /    2 octets
    +---+---+---+---+---+---+---+---+

Dynamic part:
    +---+---+---+---+---+---+---+---+
    /            Checksum           /    2 octets
    +---+---+---+---+---+---+---+---+
```

FIG. 2D

```
Static part:
    +---+---+---+---+---+---+---+---+
    /             SSRC              /    4 octets
    +---+---+---+---+---+---+---+---+

Dynamic part:
    +---+---+---+---+---+---+---+---+
    | V = 2 | P | RX |     CC       |    (RX is NOT the RTP X bit)
    +---+---+---+---+---+---+---+---+
    | M |           PT              |
    +---+---+---+---+---+---+---+---+
    /       RTP Sequence Number     /    2 octets
    +---+---+---+---+---+---+---+---+
    /     RTP Timestamp (absolute)  /    4 octets
    +---+---+---+---+---+---+---+---+
    /        Generic CSRC list      /    variable length
    +---+---+---+---+---+---+---+---+
    :  Reserved  | X | Mode |TIS|TSS:    if RX = 1
    +---+---+---+---+---+---+---+---+
    :           TS_Stride           :    1 – 4 octets, if TSS = 1
    +---+---+---+---+---+---+---+---+
    :          Time_Stride          :    1 – 4 octets, if TIS = 1
    +---+---+---+---+---+---+---+---+
```

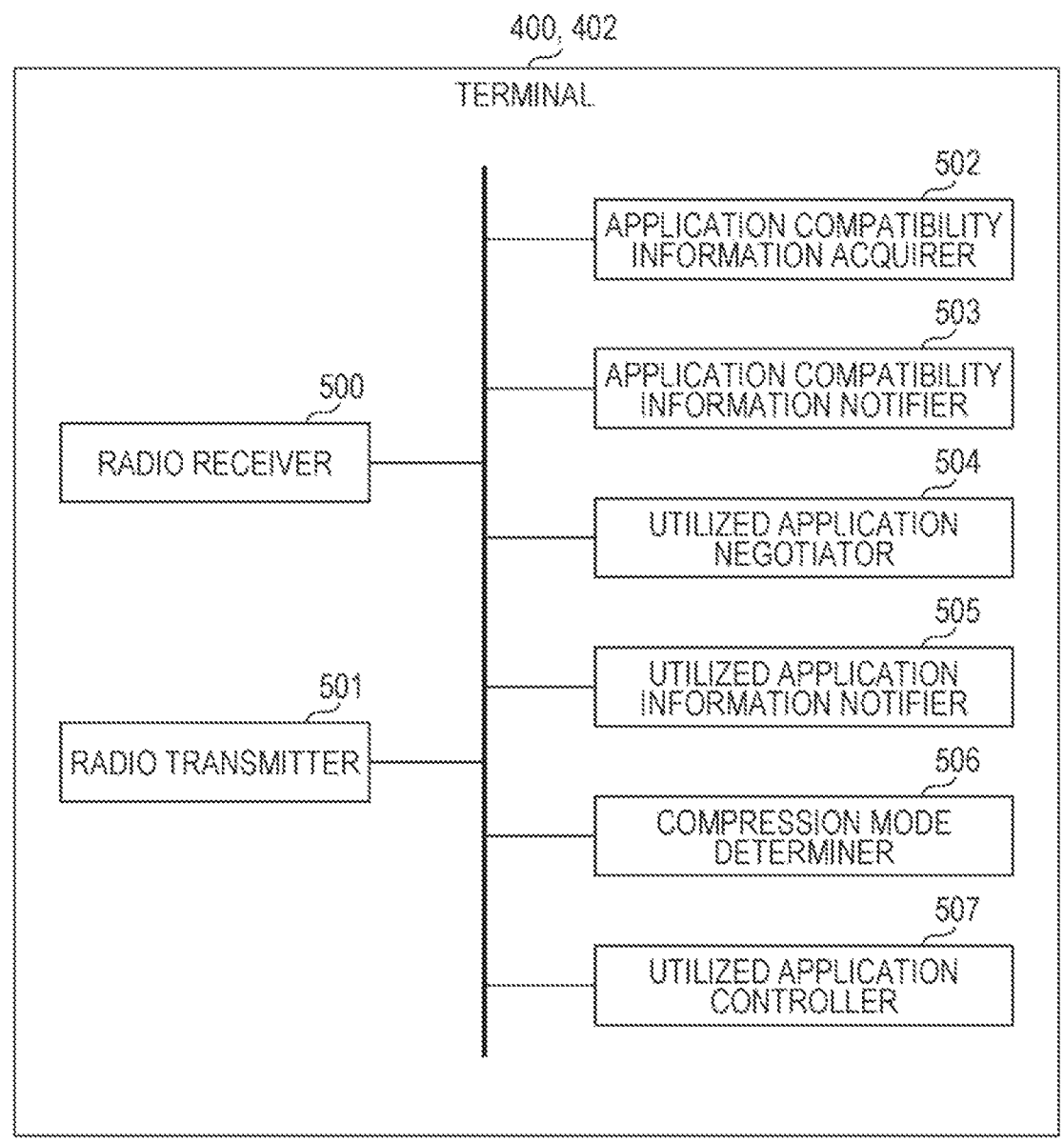

TERMINAL, BASE STATION, AND COMMUNICATION METHOD

BACKGROUND

1. Technical Field

The present disclosure relates to a terminal, a base station, and a communication method.

2. Description of the Related Art

Header compression (RoHC: Robust Header Compression) is supported between a terminal (UE (user equipment)) and a base station (eNB (eNodeB)) of a radio access network in a 3GPP (Third Generation Partnership Project) LET (Long Term Evolution) network (see, for example, 3GPP TS 36.323 v13.2.1, "Evolved Universal Terrestrial Radio Access (E-UTRA); Packet Data Convergence Protocol (PDCP) specification"). RoHC is standardized, for example, in IETF RFC 3095, "RObust Header Compression (ROHC): Framework and four profiles: RTP, UDP, ESP, and uncompressed", C. Bormann, Editor. RoHC compresses an IP (Internet protocol) header, a UDP (user datagram protocol) header, an RTP (real-time transport protocol) header, or the like, for example, by omitting a static field of information contained in the header or omitting a dynamic field of the information that is invariable even during the communication.

FIG. 1 shows a state transition diagram of RoHC. There are three states of RoHC, namely an IR (initialization and refresh) state, an FO (first order) state, and an SO (second order state). The IR state is lowest in compression. The FO state is higher in compression that the IR state. The SO state is higher in compression than the FO state.

FIGS. 2A to 2D show, as examples, classifications of static fields (static parts) and dynamic fields (dynamic parts) of an IPv4 (IP version 4) header, an IPv6 (IP version 6) header, a UDP header, and an RTP header, respectively.

In the IR state, compression is hardly performed, and the terminal transmits all static information and dynamic information. In the FO state, the terminal transmits a static field compressed and a dynamic field uncompressed. In the SO state, the terminal determines whether a dynamic field is a field that hardly varies during the communication or a field that can be reproduced from information in another field, and transmits only a minimum field in simplified form.

Communication starts from the IR state and, depending on a judgment at the transmitting end or on feedback information from the receiving end, makes a transition to a high-compression mode in the FO or SO state. The same applies to a transition from the FO state to the SO state. On the other hand, for example, in a case where a compression time limit timer has run out, a case where there has occurred a change in the feedback information from the receiving end or in a compressed field, or a similar case, a transition from the SO state to a low-compression mode in the FO or IR state or from the FO state to a low-compression mode in the IR state is made.

As described in IETF RFC 3095, "RObust Header Compression (ROHC): Framework and four profiles: RTP, UDP, ESP, and uncompressed", C. Bormann, Editor, examples of low-compression modes include IR and IR-DYN, and examples of high-compression modes include UO-0, R-0, R-0-CRC, R-1, R-1-ID, R-1-TS, UO-1, UO-1-ID, UO-1-TS, UOR-2, UOR-2-ID, and UOR-2-TS, and some high-compression mode allows a particular field of an IP header, a UDP header, or an RTP header to be added as an extended field.

A compression mode in LTE-based communication (also sometimes referred to as "high-compression mode") is used, for example, in VoLTE (Voice over LTE) or the like. VoLTE compresses an IP header, a UDP header, and an RTP header to a maximum of three bytes by transmitting only an RTP sequence number and a UDP checksum (in the case of IPv6) during a voiced section (see, for example, 3GPP R2-084764, "LS on considerations on transport bloc k sizes for VoIP"). Further, in a high-compression mode that is used in VoLTE, it is not assumed that information in an IP header is contained. Therefore, VoLTE is rendered implementation dependent when it comes to a compression mode that is established in a case where there has been a change in information in an IP header.

Further, in 3GPP, ECN (Explicit Congestion Notification) is supported as a technology with which to, in real-time communication such as VoLTE, notify a terminal of congestion of a channel of communication and prompt a codec bit-rate change (see, for example, 3GPP TS 36.300 v13.4.0, "Evolved Universal Terrestrial Radio Access (E-UTRA) and Evolved Universal Terrestrial Radio Access Network (E-UTRAN); Overall description; Stage 2" and 3GPP TS 26.114 v14.0.0, "IP Multimedia Subsystem (IMS); Multimedia telephony; Media handling and interaction"). ECN is standardized in IETF RFC 3168, "The Addition of Explicit Congestion Notification (ECN) to IP", K. Ramakrishnan, S. Floyd and D. Black.

In a case where an IP header is utilized to make congestion notification, ECN utilizes the least significant two bits (hereinafter referred to as "ECN bits") of a ToS (Type of Service) field of IPv4 or a Traffic Class field of IPv6. According to 3GPP TS 26.114 v14.0.0, "IP Multimedia Subsystem (IMS); Multimedia telephony; Media handling and interaction", terminals that perform communication with each other exchange information regarding whether the terminals are compatible with ECN with each other through an SDP (session description protocol) offer and an SDP answer immediately before the communication and negotiate with each other about whether both of the terminals utilize ECN, regardless of whether a base station to which the terminals are connected is compatible with ECN. FIG. 3 shows examples of an SDP offer and an SDP answer involved in ECN negotiations described in 3GPP TS 26.114 v14.0.0, "IP Multimedia Subsystem (IMS); Multimedia telephony; Media handling and interaction".

In a case where negotiations have been conducted about utilization of ECN, one of the terminals configures the ECN bits of the IP header at "01" or "10" and notifies a base station that the terminal is compatible with ECN, and in a case where an ECN-compatible base station has detected congestion in a congestion transmission direction, the base station configures the ECN bits of the IP header at "11" and notifies the other terminal of the occurrence of congestion. The terminal notified by the base station of the occurrence of congestion transmits request signaling to the communication partner terminal so that the communication partner terminal lowers the codec bit rate.

FIGS. 4A and 4B show examples of congestion notification and bit-rate change requests based on ECN, FIG. 4A shows an example in which a base station 404 has detected congestion in the direction of a core network 412 during the transmission of an IP packet from a terminal 400 to a terminal 402, and FIG. 4B shows an example in which a base station 406 has detected congestion in the direction of a radio access network 410 during the transmission of an IP packet from the terminal 400 to the terminal 402.

In FIG. 4A, in order to show that the terminal 400 is compatible with ECN, the terminal 400 configures the ECN bits of the IP header at "10" and transmits the IP packet to the terminal 402. The base station 404, located on a channel of communication from the terminal 400 to the terminal 402, detects congestion on a core network 412 side or uplink congestion on a radio access network 408 side, changes the ECN bits of the IP header to "11", and transmits the IP packet to the terminal 402. Upon detecting that the ECN bits of the IP header are "11", the terminal 402 transmits, to the terminal 400, a bit-rate change request to lower the bit rate.

Further, in FIG. 4B, in order to show that the terminal 400 is compatible with ECN, the terminal 400 configures the ECN bits of the IP header at "10" and transmits the IP packet to the terminal 402. The base station 406, located on the channel of communication from the terminal 400 to the terminal 402, detects congestion downlink congestion on a radio access network 410 side, changes the ECN bits of the IP header to "11", and transmits the IP packet to the terminal 402. Upon detecting that the ECN bits of the IP header are "11", the terminal 402 transmits, to the terminal 400, a bit-rate change request to lower the bit rate. As for this process, the same applies to the transmission of an IP packet from the terminal 402 to the terminal 400.

SUMMARY

As mentioned above, in a high-compression mode of VoLTE, it is not assumed that an IP header is contained. Meanwhile, ECN makes congestion notification using an IP header. Therefore, it is difficult to apply a high-compression mode in an ECN-supporting environment.

One non-limiting and exemplary embodiment provides a terminal, a base station, and a communication method that make it possible to appropriately apply a high-compression mode in an ECN-supporting environment.

In one general aspect, the techniques disclosed here feature a terminal including: an acquirer that acquires first application compatibility information indicating an application with which a base station located on a channel of communication with a communication partner terminal is compatible; a negotiator that negotiates with the communication partner terminal about utilization of an application, included in applications with which the terminal is compatible, that matches the application indicated by the first application compatibility information; and a compression mode determiner that determines a compression mode on the basis of a result of negotiations about the application.

An aspect of the present disclosure makes it possible to appropriately apply a high-compression mode in an ECN-supporting environment.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A to 2D are diagrams showing static and dynamic parts of IPv4, IPv6, UDP, and RTP headers that are used in RoHC, respectively;

FIG. 5 is a block diagram showing an example configuration of a terminal according to an embodiment of the present disclosure;

DETAILED DESCRIPTION

Underlying Knowledge Forming Basis of the Present Disclosure

Figure 4A:
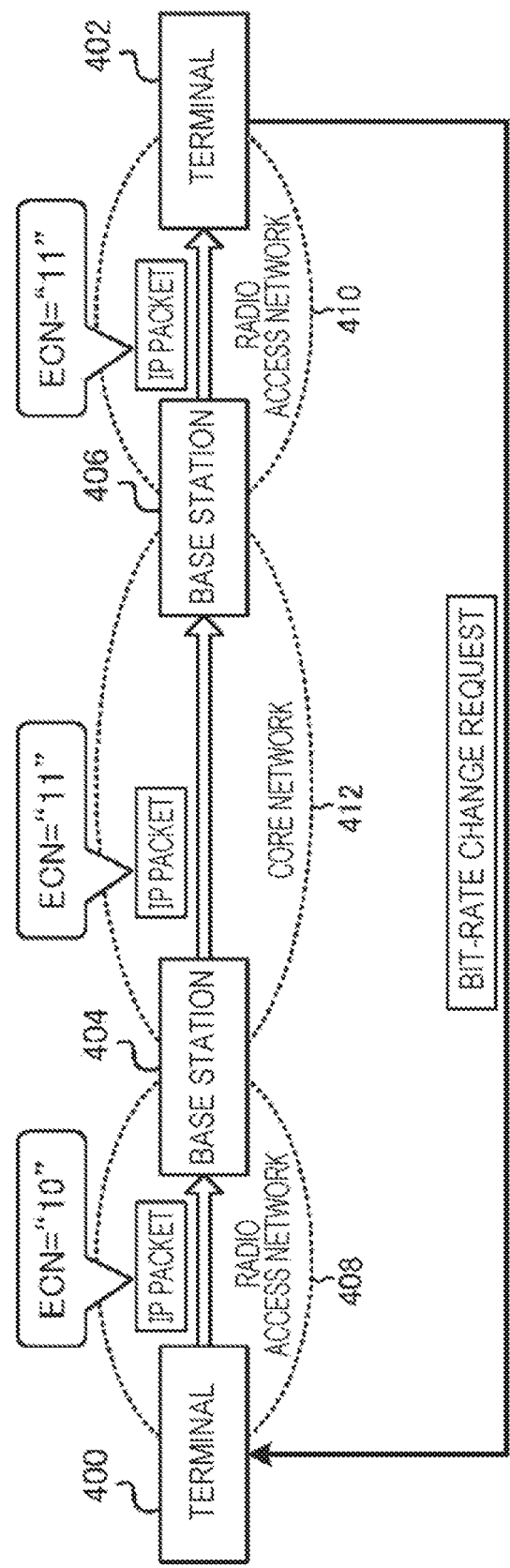
FIG. 4A is a diagram showing an example of ECN-based congestion control.

A case is assumed where a plurality of base stations located on a channel of communication between terminals that make ECN-based congestion notification include a base station that is not compatible with ECN. For example, the base station 406 (or the base station 404) is not compatible with ECN in the example shown in FIG. 4A, the base station 406 does not know a reason for a change in the IP header (change in the ECN bits). For this reason, the base station 406 may omit to transmit the ECN bits in the IP header by applying such a high-compression mode as to omit the IP header. Alternatively, the base station 406 may transmit the ECN bits with the compression mode of RoHC changed to a low-compression mode such as IR or IR-DYN, regardless of ECN-based congestion notification.

Further, a compression mode involving the use of ECN is not specified but implementation dependent. Therefore, even when a base station located on a channel of communication between terminals that make ECN-based congestion notification is compatible with ECN, the base station may, depending on implementation, change to a low-compression mode such as IR or IR-DYN in making ECN-based congestion notification.

In such a case of making ECN-based congestion notification, radio resources are wasted by frequent occurrences of congestion notification due to abnormal ECN-based congestion notification or a change to a low-compression mode.

To address this problem, an aspect of the present disclosure is intended to appropriately apply a high-compression mode in an ECN-supporting environment. This makes it possible to prevent frequent occurrences of congestion notification and reduce waster of radio resources.

The following describes embodiments of the present disclosure in detail with reference to FIGS. 4 to 11.

Figure 4B:
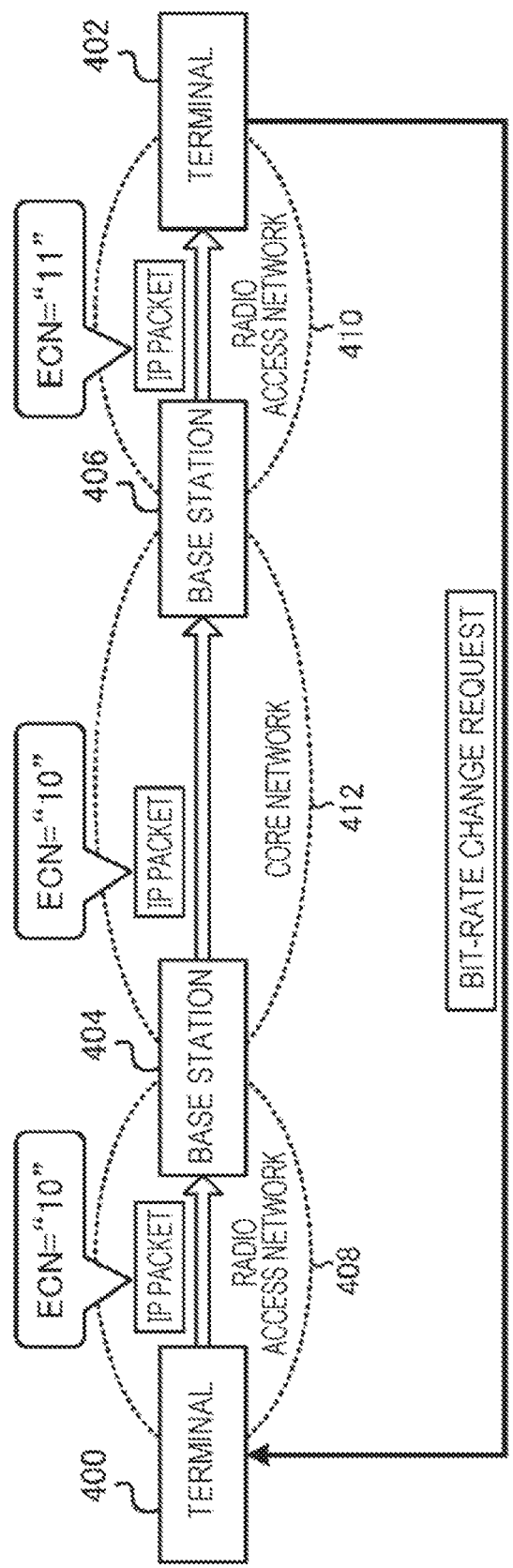
FIG. 4B is a diagram showing an example of ECN-based congestion control.

The following describes, as an example, a communication system, including the terminals 400 and 402 and the base stations 404 and 406 as shown in FIG. 4, in which the terminals 400 and 402 perform communication with each other.

Configuration of Terminal

FIG. 5 is a block diagram showing a configuration of each of the terminals 400 and 402 according to the present embodiment. It should be noted that FIG. 5 shows only components closely associated with the present disclosure and omits conventional functions or the like of the terminal.

In each of the terminals 400 and 402 shown in FIG. 5, a radio receiver 500 receives signaling or data that is transmitted from the base station 404 or 406 or the like, and outputs the signaling or data thus received to a corresponding component of the terminal 400 or 402. A radio transmitter 501 transmits, to the base station 404 or 406 or the like, signaling or data that is inputted from each component.

An application compatibility information acquirer 502 acquires application compatibility information indicating an application with which the base station 404 or 406 is compatible and a function associated with the application. For example, in a case where the base station 404 or 406 is compatible with ECN, the application compatibility information includes ECN.

An application compatibility information notifier 503 notifies the base station 404 or 406 of application compatibility information indicating an application with which the terminal (terminal 400 or 402) is compatible and a function associated with the application. For example, the application compatibility information notifier 503 notifies the base station 404 or 406 of an application, included in applications with which the terminal (terminal 400 or 402) is compatible (or functions associated with the applications), that matches an application indicated by application compatibility information of the base station 404 or 406 (or a function associated with the application). The application of which the base station 404 or 406 has been notified serves as application compatibility information of the terminal 400 or 402.

On the basis of the application compatibility information of the base station 404 or 406 acquired by the application compatibility information acquirer 502, a utilized application negotiator 504 negotiates with a communication partner terminal about an application to be utilized in communications and a function related to the application. Specifically, the utilized application negotiator 504 negotiates with the communication partner terminal about utilization of an application, included in the applications with which the terminal is compatible, that matches an application indicated by application compatibility information acquired from the base station 404 or 406. For example, in a case where the base station 404 or 406 is compatible with ECN, the utilized application negotiator 504 negotiates about whether to utilize ECN, but in a case where the base station 404 or 406 is not compatible with ECN, the utilized application negotiator 504 does not negotiate about whether to utilize ECN.

A utilized application information notifier 505 notifies the base station 404 or 406 of utilized application information indicating an application to be utilized by the terminal 400 or 402 in communications or a function related to the application (hereinafter sometimes simply referred to as "utilized application), as determined as a result of negotiations conducted by the utilized application negotiator 504.

A compression mode determiner 506 determines a header compression mode on the basis of a utilized application about which the utilized application negotiator 504 has negotiated. For example, in a case where the utilized application is ECN, the compression mode determiner 506 may determine a compression mode suitable for ECN. Examples of the compression mode suitable for ECN include a mode with the highest compression rate that includes a field that notifies ECN bits.

For example, in carrying out a handover, a utilized application controller 504 determines stoppage or continuation of a currently utilized application on the basis of an application with which the handover destination base station 404 or 406 is compatible. Further, in a case where, after an application has been stopped, a handover is made again to the base station 404 or 406 that is compatible with the currently stopped application, the utilized application controller 507 determines resumption of utilization of the application. Moreover, in a case of having determined stoppage or resumption of a utilized application, the utilized application controller 507 negotiates with the communication partner terminal about stoppage or resumption of the utilized application. Further, the utilized application controller 507 notifies the base station 404 or 406 of utilized application control information indicating the content (stoppage, resumption, or the like) of a determination made as a result of the negotiations.

Configuration of Base Station

Figure 6:
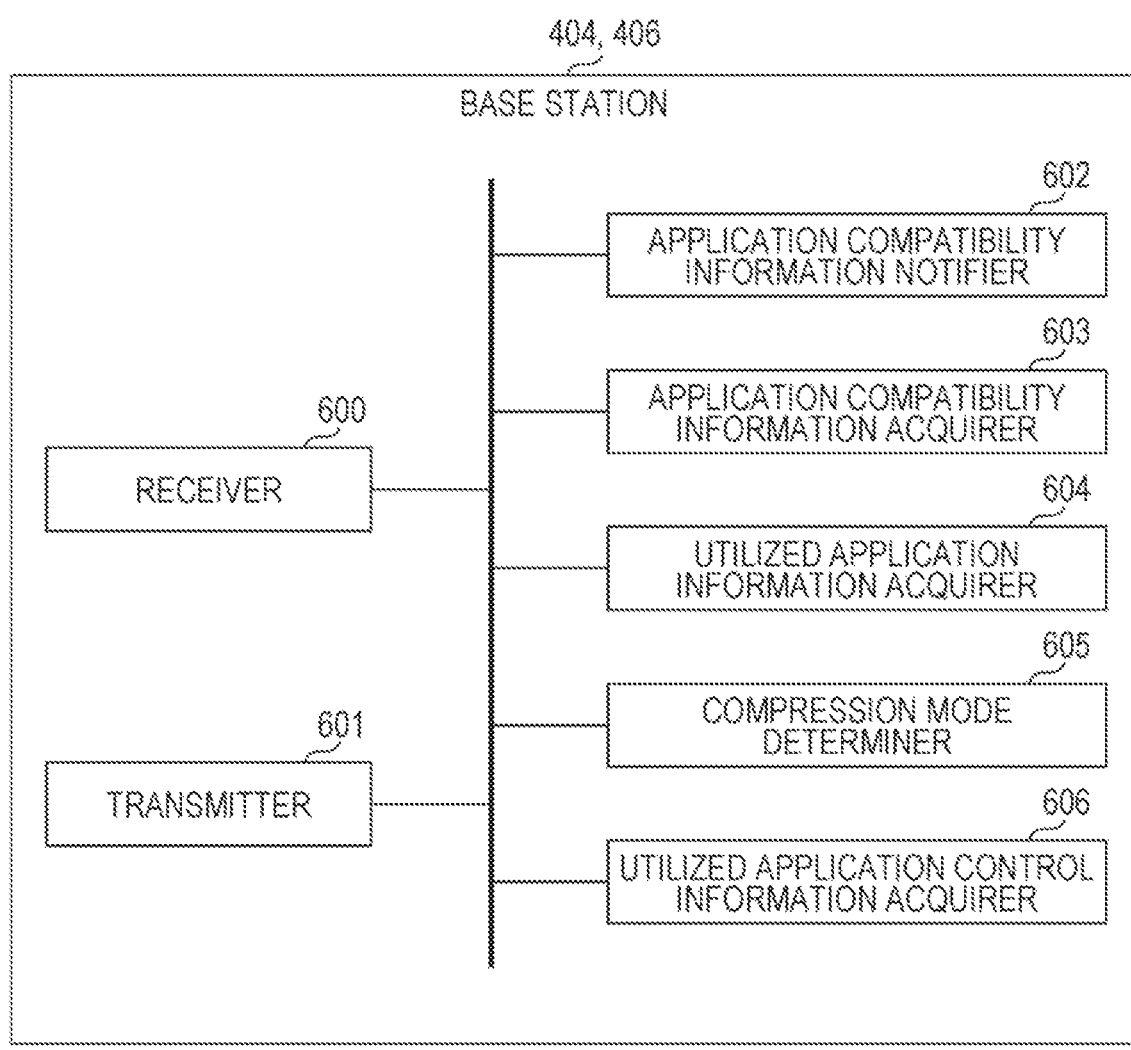
FIG. 6 is a block diagram showing an example configuration of a base station according to the embodiment of the present disclosure.

FIG. 6 is a block diagram showing a configuration of each of the base stations 404 and 406 according to the present embodiment. It should be noted that FIG. 6 shows only components closely associated with the present disclosure and omits conventional functions or the like of the base station.

In each of the base stations 404 and 406 shown in FIG. 6, a receiver 600 receives signaling or data that is transmitted from the terminal 400 or 402 or the core network 412, and outputs the signaling or data thus received to a corresponding component of the base station 404 or 406. A transmitter 601 transmits, to the terminal 400 or 402 or the core network 412, signaling or data that is inputted from each component.

An application compatibility information notifier 602 notifies the terminal 400 or 402 of application compatibility information indicating an application with which the base station (base station 404 or 406) is compatible and a function associated with the application.

An application compatibility information acquirer 603 acquires application compatibility information indicating an application with which the terminal 400 or 402 is compatible and a function associated with the application. For example, application compatibility information of the terminal 400 or 402 includes an application, included in applications with which the terminal 400 or 402 is compatible (or functions related to the applications), that matches an application with which the base station 404 or 406 is compatible (or a function related to the application).

A utilized application information acquirer 604 acquires, from the terminal 400 or 402, utilized application information indicating an application (utilized application) to be utilized by the terminal 400 or 402 in communications, as determined as a result of negotiations conducted by the terminal 400 or 402 with the communication partner terminal.

A compression mode determiner 605 determines a header compression mode on the basis of a utilized application indicated by utilized application information acquired by the utilized application information acquirer 604.

A utilized application control information acquirer 606 acquires utilized application control information indicating the content (stoppage or resumption of a utilized application) of a determination made and negotiations conducted by the terminal 400 or 402. Moreover, the utilized application control information acquirer 606 controls (e.g. stops or resumes), on the basis of the utilized application control information thus acquired, a function of an application to be utilized by the terminal 400 or 402.

Method for Notification of Application Compatibility Information

Figure 7A:
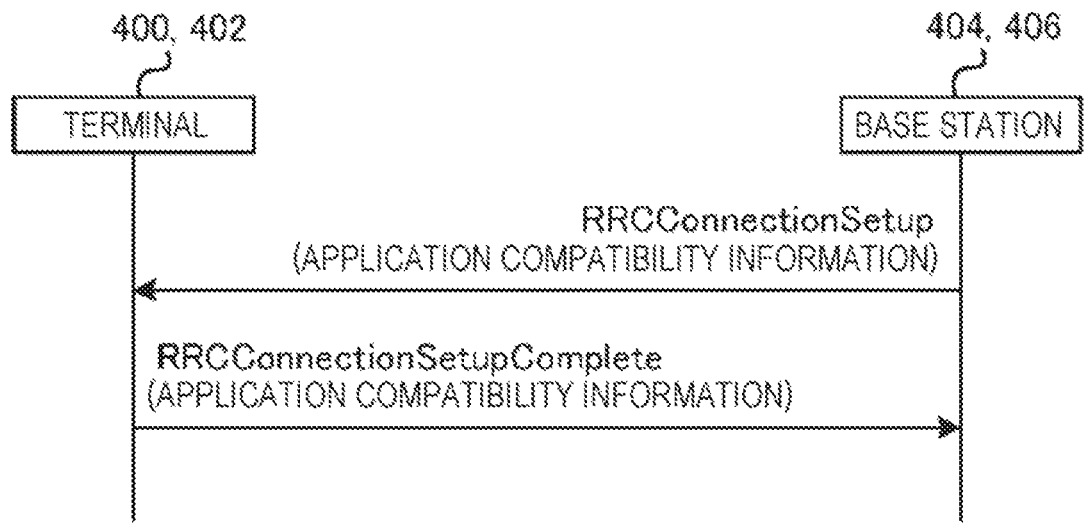
FIG. 7A is a diagram showing an example of a method for notification of application compatibility information according to the embodiment of the present disclosure.
Figure 7B:
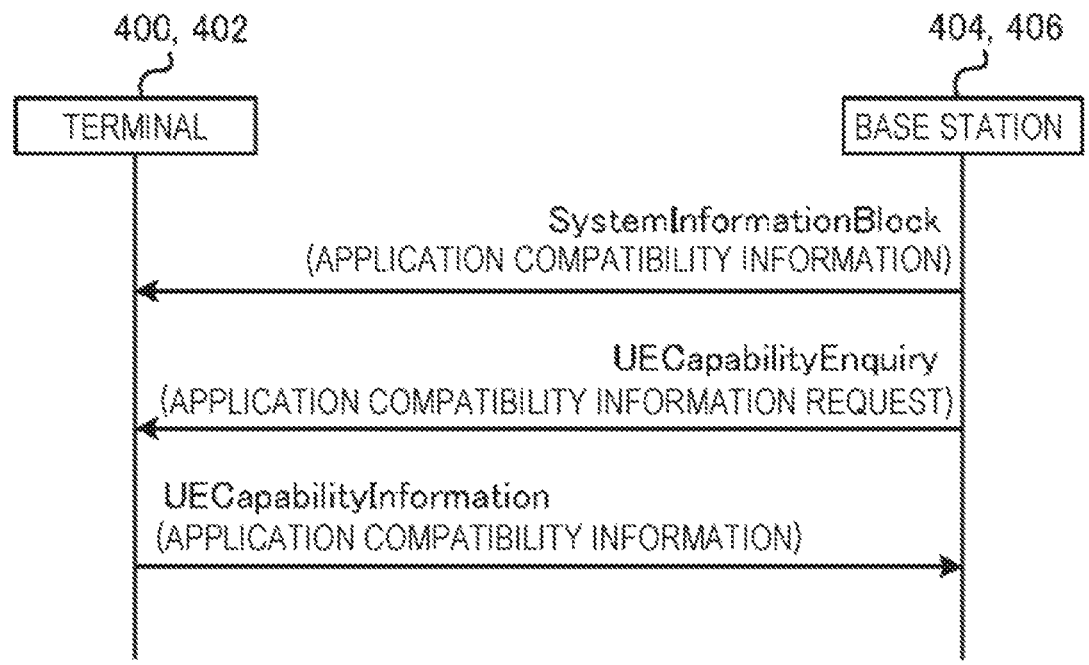
FIG. 7B is a diagram showing an example of a method for notification of application compatibility information according to the embodiment of the present disclosure.

FIGS. 7A and 7B show examples of methods for notification of application compatibility information of the base station 404 or 406 and application compatibility information of the terminal 400 or 402.

The operations shown in FIGS. 7A and 7B are performed prior to negotiations that the terminal 400 or 402 conducts about application utilization.

FIG. 7A involves the use of a signaling message according to RRC (Radio Resource Control) connection establishment described in 3GPP TS 36.331 v13.2.0, "Evolved Universal Terrestrial Radio Access (E-UTRA); Radio Resource Control (RRC); Protocol specification".

Specifically, during RRC connection establishment, the application compatibility information notifier 602 of the base station 404 or 406 notifies the terminal 400 or 402 via the transmitter 601 of RRC Connection Setup signaling containing application compatibility information indicating an application such as ECN with which the base station 404 or 406 is compatible.

It should be noted that this application compatibility information may contain information regarding, for example, whether the base station 404 or 406 is compatible with header compression suitable for the application with which it is compatible and which header compression mode to use in a case where it is compatible.

Meanwhile, in the terminal 400 or 402, when the radio receiver 500 receives RRC Connection Setup signaling that is notified from the base station 404 or 406, the application compatibility information acquirer 502 analyzes the RRC Connection Setup signaling. Then, in a case where application compatibility information of the base station 404 or 406 is contained, the application compatibility information acquirer 502 compares the application compatibility information with an application with which the terminal (terminal 400 or 402) is compatible, and generates application compatibility information of the terminal 400 or 402 indicating an application that matches. Then, the application compatibility information notifier 503 of the terminal 400 or 402 notifies the base station 404 or 406 via the radio transmitter 501 of RRC Connection Setup Complete signaling containing the application compatibility information of the terminal 400 or 402.

In the base station 404 or 406, when the receiver 600 receives RRC Connection Setup Complete signaling that is transmitted from the terminal 400 or 402, the application compatibility information acquirer 603 analyzes the RRC Connection Setup Complete signaling and, in a case where application compatibility information of the terminal 400 or 402 is contained, acquires the application compatibility information.

FIG. 7B involves the use of a signaling message according to system information acquisition and UE capability transfer described in 3GPP TS 36.331 v13.2.0, "Evolved Universal Terrestrial Radio Access (E-UTRA); Radio Resource Control (RRC); Protocol specification".

Specifically, the application compatibility information notifier 602 of the base station 404 or 406 notifies the terminal 400 or 402 via the transmitter 601 of System Information Block (SIB) signaling containing application compatibility information indicating an application such as ECN with which the base station 404 or 406 is compatible.

It should be noted that this application compatibility information may contain information regarding, for example, whether the base station 404 or 406 is compatible with header compression suitable for the application with which it is compatible and which header compression mode to use in a case where it is compatible.

Meanwhile, in the terminal 400 or 402, when the radio receiver 500 receives System Information Block signaling that is notified from the base station 404 or 406, the application compatibility information acquirer 502 analyzes the System Information Block signaling. Then, in a case where application compatibility information of the base station 404 or 406 is contained, the application compatibility information acquirer 502 compares the application compatibility information with an application with which the terminal (terminal 400 or 402) is compatible, and generates application compatibility information of the terminal 400 or 402 indicating an application that matches.

After that, the application compatibility information acquirer 603 of the base station 404 or 406 notifies the terminal 400 or 402 via the transmitter 601 of UE Capability Enquiry signaling containing an application compatibility information request for provision of application compatibility information of the terminal 400 or 402.

In the terminal 400 or 402, when the radio receiver 500 receives UE Capability Enquiry signaling (application compatibility information request) transmitted from the base station 404 or 406, the application compatibility information notifier 503 notifies the base station 404 or 406 via the radio receiver 601 of UE Capability Information signaling containing application compatibility information of the terminal 400 or 402 generated by the application compatibility information acquirer 502.

In the base station 404 or 406, when the receiver 600 receives UE Capability Information signaling that is transmitted from the terminal 400 or 402, the application compatibility information acquirer 603 analyzes the UE Capability Information signaling and, in a case where application compatibility information of the terminal 400 or 402 is contained, acquires the application compatibility information.

Such notification of application compatibility information of the terminal 400 or 402 to the base station 404 or 406 allows the base station 404 or 406 to identify an application that the terminal 400 or 402 is capable of utilizing.

In the examples shown in FIGS. 7A and 7B, a method involving the use of signaling described in 3GPP TS 36.331 v13.2.0, "Evolved Universal Terrestrial Radio Access (E-UTRA); Radio Resource Control (RRC); Protocol specification" has been shown as an example of a method for notification of application compatibility information of the base station 404 or 406 and application compatibility information of the terminal 400 or 402 prior to the start of communication by the terminal 400 or 402. However, the signaling that is used for notification of application compatibility information is not limited to this but may for example be MAC CE (MAC Control Element) described in 3GPP TS 36.321 v13.2.0, "Evolved Universal Terrestrial Radio Access (E-UTRA); Medium Access Control (MAC) protocol specification".

Method for Negotiations about Utilized Application

The following describes negotiations that the terminal 400 or 402 conducts with the communication partner terminal about application utilization.

When the terminal 400 or 402 starts application-based communication such as VoLTE, the utilized application negotiator 504 creates an SDP offer on the basis of application compatibility information of the base station 404 or 406 acquired by the application compatibility information acquirer 502.

Figure 1:
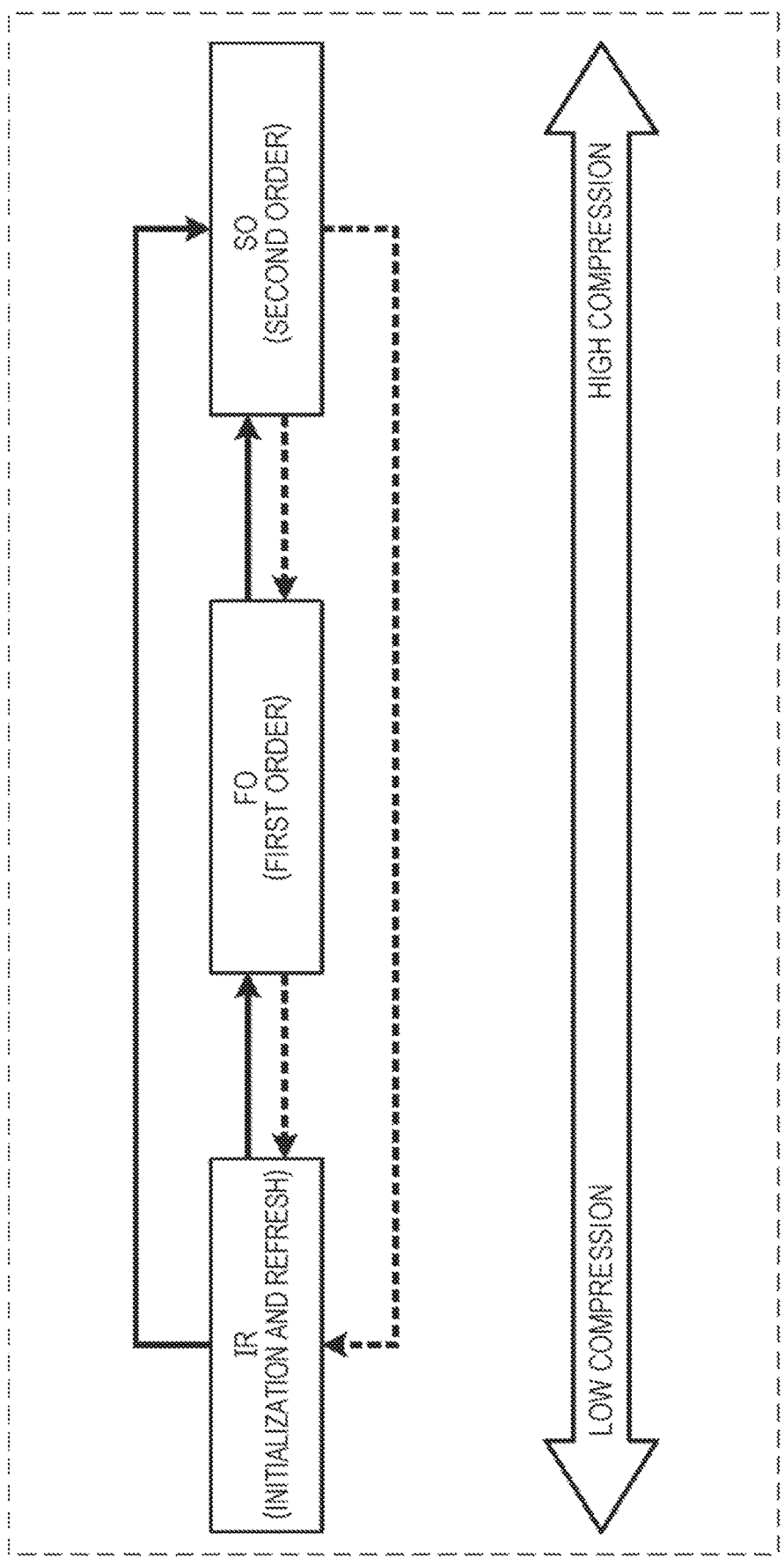
FIG. 1 is a diagram showing a relationship between RoHC state transition and header compression rate.
Figure 3:
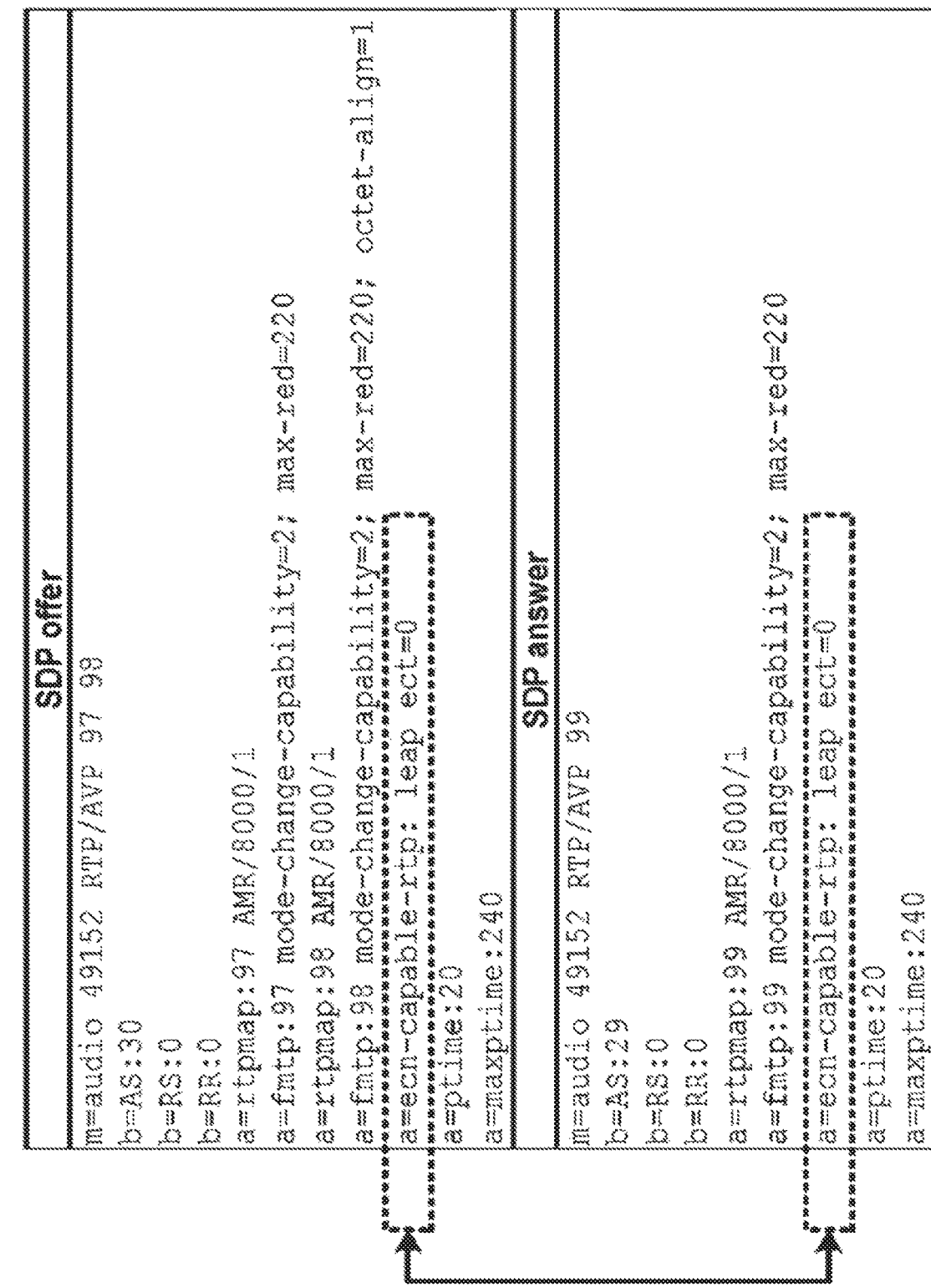
FIG. 3 is a diagram showing an example in which negotiations are conducted through an SDP offer and an SDP answer.

For example, in a case where ECN is included in the application compatibility information of the base station 404 or 406, the utilized application negotiator 504 may include ECN in the SDP offer if the terminal is compatible with ECN (see, for example, FIG. 3). On the other hand, in a case where ECN is not included in the application compatibility information of the base station 404 or 406, the utilized application negotiator 504 does not include ECN in the SDP offer even in a case where the terminal is compatible with ECN. That is, the utilized application negotiator 504 creates an SDP offer including ECN only in a case where both the base station 404 or 406 and the terminal are compatible with ECN.

The SDP offer created by the utilized application negotiator 504 is transmitted to the communication partner terminal 400 or 402 via the radio transmitter 501.

Meanwhile, the utilized application negotiator 504 of the terminal 400 or 402 that has received the SDP offer via the radio receiver 501 creates an SDP answer on the basis of the application compatibility information of the base station 404 or 406 acquired by the application compatibility information acquirer 502.

For example, in a case where ECN is included in the application compatibility information of the base station 404 or 406 and ECN is included in the SDP offer, the utilized application negotiator 504 includes ECN in the SDP answer if the terminal is compatible with ECN (see, for example, FIG. 3). On the other hand, in a case where ECN is not included in the application compatibility information of the base station 404 or 406, the utilized application negotiator 504 does not include ECN in the SDP answer even in a case where ECN is included in the SDP offer and the terminal is compatible with ECN. That is, the utilized application negotiator 504 creates an SDP answer including ECN only in a case where both the base station 404 or 406 and the terminal are compatible with ECN and ECN is included in the SDP offer.

The SDP answer created by the utilized application negotiator 504 is transmitted to the communication partner terminal 400 or 402 via the radio transmitter 501.

In this way, when both the terminals 400 and 402 that perform communication are compatible with ECN and the base stations 404 and 406 located on the channel of communication between the terminals 400 and 402 are compatible with ECN, utilization of ECN is determined by negotiations. In other words, in a case where the base stations 404 and 406 located on the channel of communication are not compatible with ECN, the terminals 400 and 402 do not negotiate with each other about ECN utilization, even if both the terminals 400 and 402 that perform communication are capable of utilizing ECN. As a result, in a case where ECN is utilized, congestion can be normally notified by ECN, as the base stations 404 and 406 located on the channel of communication between the terminals 400 and 402 are compatible with ECN, too.

Method for Notification of Utilized Application Information

The following describes a method for notification of utilized application information indicating an utilized application determined by negotiations between the terminals 400 and 402 using an SDP offer and an SDP answer.

Figure 8A:
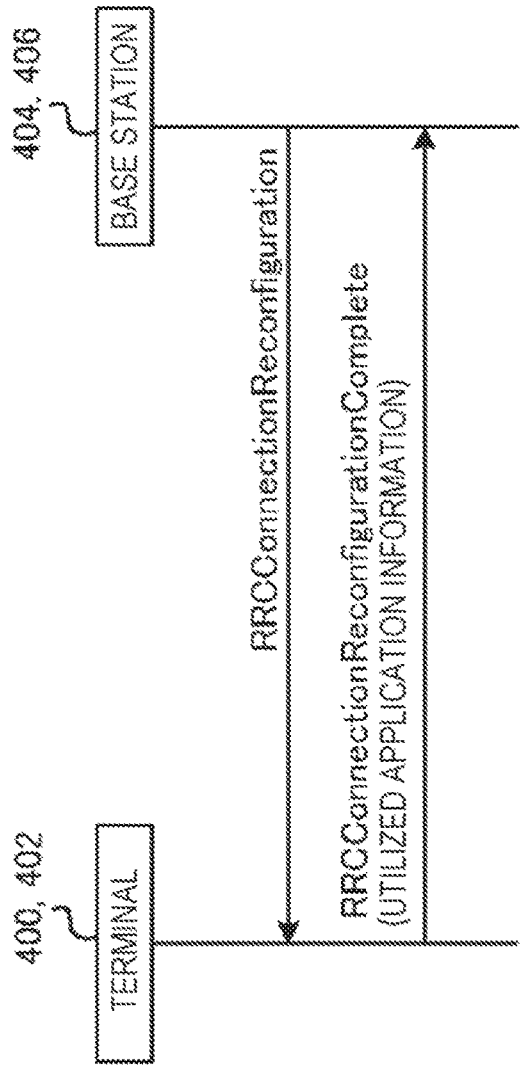
FIG. 8A is a diagram showing an example of a method for notification of utilized application information according to the embodiment of the present disclosure.
Figure 8B:
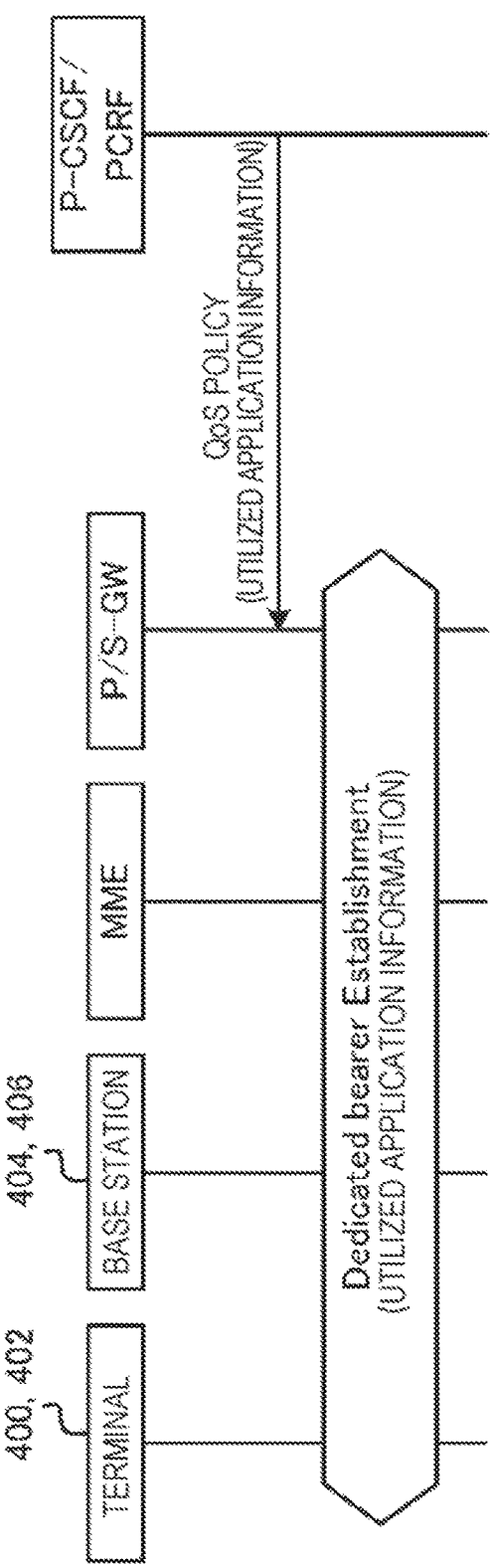
FIG. 8B is a diagram showing an example of a method for notification of utilized application information according to the embodiment of the present disclosure.

FIGS. 8A and 8B show examples of methods for notification of utilized application information from the terminal 400 or 402 to the base station 404 or 406.

FIG. 8A involves the use of a signaling message according to RRC connection reconfiguration described in 3GPP TS 36.331 v13.2.0, "Evolved Universal Terrestrial Radio Access (E-UTRA); Radio Resource Control (RRC); Protocol specification".

Specifically, in the terminal 400 or 402, the radio receiver 500 receives RRO Connection Reconfiguration signaling from the base station 404 or 406 in order to configure a radio bearer for use in application-based communication data transmission and reception. Upon receiving the RRC Connection Reconfiguration signaling, the utilized application information notifier 505 notifies the base station 404 or 406 via the radio transmitter 501 of RRO Connection Reconfiguration Complete signaling containing all or part (such as ECN utilization) of utilized application information determined as a result of negotiations conducted by the utilized application negotiator 504.

In a case where the utilized application negotiator 504 has not completed negotiations about a utilized application at a point of time where the terminal 400 or 402 has received the RRC Connection Reconfiguration signaling from the base station 404 or 406, the utilized application information notifier 505 transmits the Connection Reconfiguration Complete signaling only after the completion of the negotiations.

In the base station 404 or 406, when the receiver 600 receives RRC Connection Reconfiguration Complete signaling that is transmitted from the terminal 400 or 402, the utilized application information acquirer 604 analyzes the RRC Connection Reconfiguration Complete signaling and, in a case where utilized application information is contained, acquires the utilized application information.

FIG. 8B involves the use of a signaling message according to dedicated bearer activation described in 3GPP TS 23.401 v14.0.0, "General Packet Radio Service (GPRS) enhancements for Evolved Universal Terrestrial Radio Access Network (E-UTRAN) access".

First, in the IMS (IP Multimedia Subsystem), which is an LTE application signaling network, the P-CSCF (Proxy-Call Session Control Function), which is a network node that is capable of acquiring information about which negotiations have been conducted through an SDP offer and an SDP answer, acquires utilized application information indicating a utilized application about which negotiations have been conducted between the terminals 400 and 402 that perform application-based communication.

Then, the P-CSCF notifies the PCRF (Policy and Charging Rules Function), which is a network node on the core network 412 of LTE, of all or part (such as ECN utilization) of the utilized application information. Further, the PCRF notifies the P-GW (Packet Data Network Gateway), which is a network node on the core network 412 of LTE, of the utilized application information. Upon receiving all or part of the utilized application information, the P-GW transmits Dedicated Bearer Establishment process signaling containing the utilized application information. The Dedicated Bearer Establishment process signaling is intended to configure a bearer for use in application-based communication data transmission and reception.

In the base station 404 or 406, when the receiver 600 receives the Dedicated Bearer Establishment process signaling, the utilized application information acquirer 604 analyzes the Dedicated Bearer Establishment process signaling and, in a case where utilized application information is contained, acquires the utilized application information.

In this way, the base station 404 or 406 is notified of utilized application information indicating an application about which the terminal 400 or 402 has negotiated with the communication partner terminal on the basis of application compatibility information of the base station 404 or 406. This allows the base station 404 or 406, for example, to confirm that the terminal 400 or 402 has normally conducted negotiations on the basis of an application with which the base station 404 or 406 is compatible. Further, the base station 404 or 406 can change header compression modes on the basis of an application to be utilized by the terminal 400 or 402 (which will be described in detail later).

Instead of including utilized application information in Dedicated Bearer Establishment process signaling as shown in FIG. 8B, the terminal 400 or 402 may make notification of a utilized application by configuring a QCI (QoS class identifier) corresponding to the utilized application and making notification of the QCI thus configured. For example, as described in 3GPP TS 23.401 v14.0.0, "General Packet Radio Service (GPRS) enhancements for Evolved Universal Terrestrial Radio Access Network (E-UTRAN) access" and the like, the QCI of a bearer for use in VoLTE data transmission and reception is "1". On the other hand, with a QCI newly defined as "1.1" for use in ECN-based VoLTE, the terminal 400 or 402 may transmit Dedicated Bearer Establishment process signaling containing "QCI=1.1".

Further, although FIGS. 8A and 8B has shown, as examples, methods by which the base station 404 or 406 uses signaling according to RRC connection reconfiguration or Dedicated Bearer Establishment signaling in order to acquire utilized application information, these examples are not intended to limit a method for notification of utilized application information. For example, inclusion of information (where the ECN bits of the IP header are "01" or "10") corresponding to ECN in an IP packet transmitted by the terminal 400 or 402 having started communication may allow the base station 404 or 406 (utilized application information acquirer 604) to identify inclusion of ECN in a utilized application. That is, the utilized application information acquirer 604 implicitly acquires utilized application information including ECN by identifying the content of the ECN bits. In this case, there is no longer a need for such signaling as that shown in FIG. 8A or 8B for notification of the utilized application information.

Compression Mode Determination Method

The following describes a method by which the compression mode determiner 506 of each of the terminals 400 and 402 and the compression mode determiner 605 of each of the base stations 404 and 406 determine a header compression mode.

The compression mode determiner 506 and the compression mode determiner 605 determines a header compression mode suitable for a utilized application on the basis of utilized application information (i.e. a result of negotiations between the terminals 400 and 402 about an application).

It should be noted that, as mentioned earlier, in a case where application compatibility information notified from the base station 404 or 406 to the terminal 400 or 402 contains information indicating which header compression mode to use, the compression mode determiner 506 and the compression mode determiner 605 determine, in accordance with the header compression mode included in the application compatibility information, a compression mode to be applied.

Figure 9:
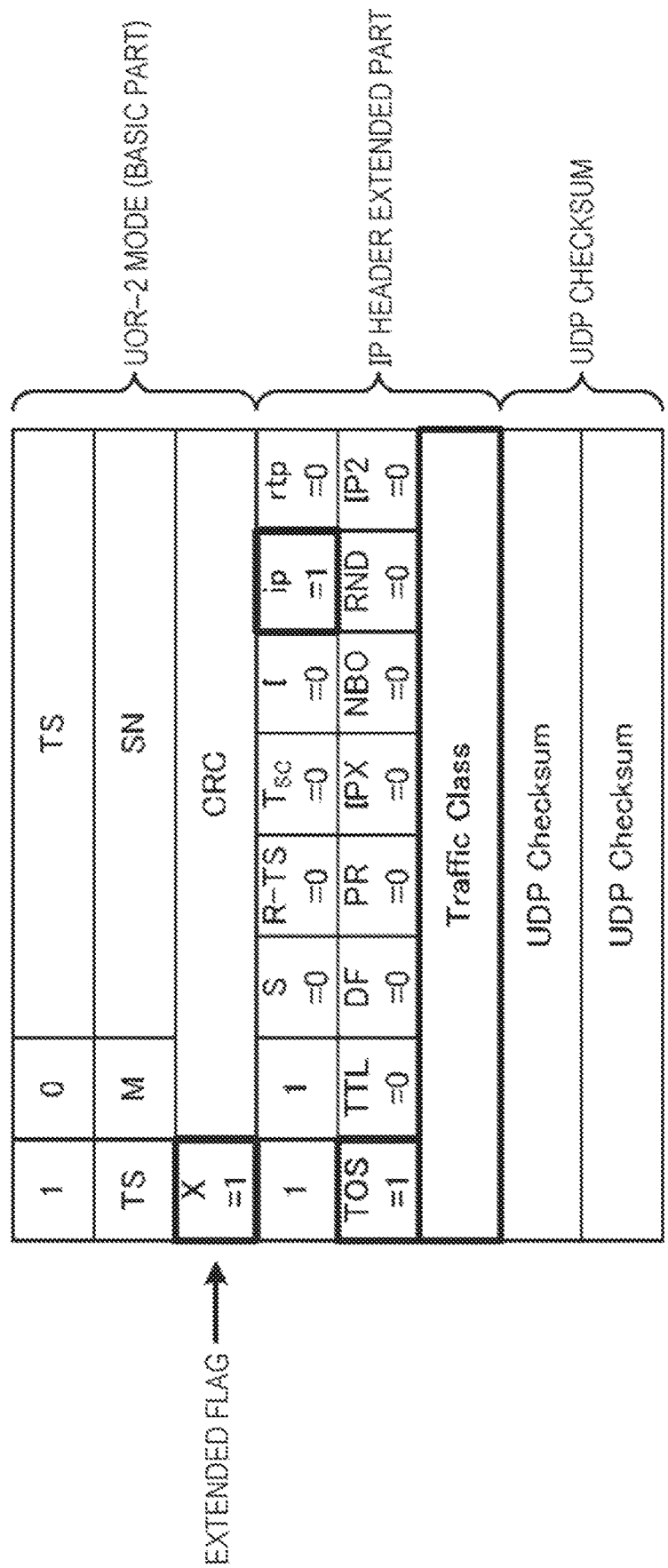
FIG. 9 is a diagram showing an example of a high-compression mode with respect to ECN according to the embodiment of the present disclosure.

FIG. 9 is shows an example of an RoHC high-compression mode in which VoLTE ECN is utilized as a utilized application.

As mentioned earlier, VoLTE assumes that only an RTP sequence number and a UDP checksum (in the case of IPv6) are transmitted during a voiced section and an IP header, a UDP header, and an RTP header are compressed to a maximum of three bytes.

Meanwhile, ECN utilizes the least significant two bits of a ToS field (in the case of IPv4) or a Traffic Class field (in the case of IPv6) of the IP header.

Accordingly, it is only necessary to use, as an RoHC high-compression mode suitable for ECN utilization, a high-compression mode that can include only a ToS field or Traffic Class field.

For example, according to IETF RFC 3095, "RObust Header Compression (ROHC): Framework and four profiles: RTP, UDP, ESP, and uncompressed", C. Bormann, Editor, it is possible to prepare an IP header extended part by setting an extended flag (X) in a high-compression mode and include a particular field (ToS field or Traffic Class field) in this IP header extended part.

Therefore, the compression mode determiner 506 and the compression mode determiner 605 need only select a mode corresponding to an extended flag from among high-compression modes. In the example shown in FIG. 9, an IP header extended part (i.e. a field corresponding to ip=1) is prepared by setting an extended flag (X=1) in the UOR-2 mode, which is a high-compression mode corresponding to an extended flag (X), and a Traffic Class field is added to the IP header extended part.

This allows the terminal 400 or 402 to determine a compression mode suitable for an application determined in consideration of an application with which the base station 404 or 406 is compatible. Further, the base station 404 or 406 can determine a header compression mode suitable for an application determined as a result of negotiations conducted by the terminal 400 or 402. For example, in a case where the terminal 400 or 402 utilizes ECN, the base station 404 or 406 can appropriately determine such an RoHC compression mode as to correspond to ECN-based congestion notification.

It should be noted that the RoHC high-compression mode suitable for ECN utilization is not limited to the UOR-2 mode but needs only be a high-compression mode that can include a field (e.g. a ToS field or a Traffic Class field) that is used in transmission of ECN bits. For example, the compression mode determiner 506 and the compression mode determiner 605 may select a mode with the highest compression rate from among high-compression modes that can include a ToS field or a Traffic Class field.

Control of Utilized Application During Handover

The following describes a case where the terminal 400 or 402 currently connected to the base station 404 or 406 is handed over to be brought under control of another base station 404 or 406.

Figure 10A:
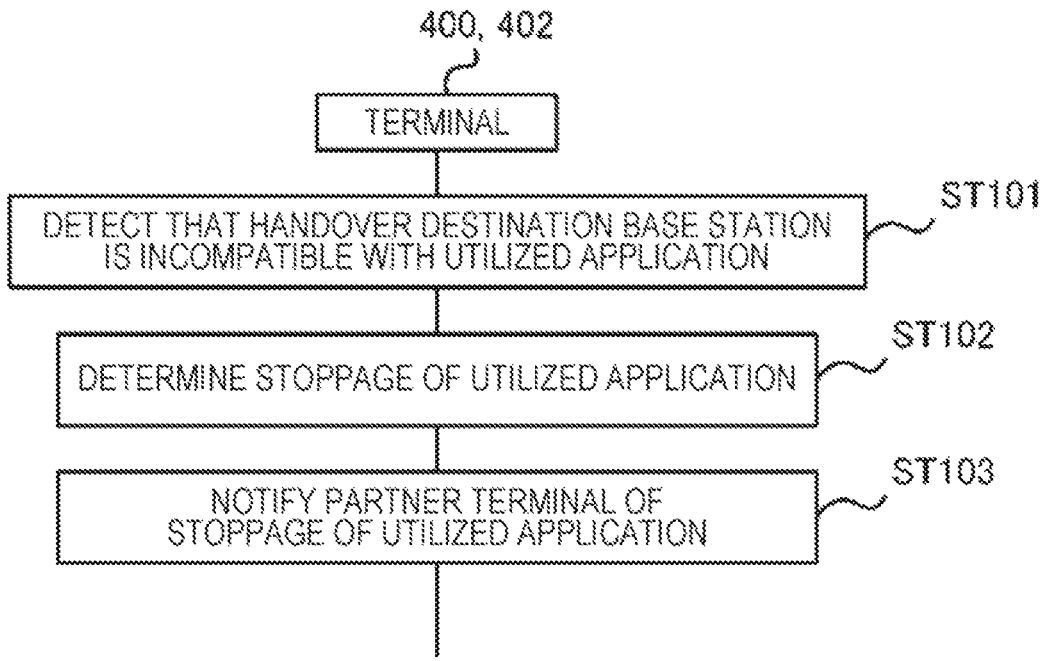
FIG. 10A is an example of a method for control of a utilized application during a handover according to the embodiment of the present disclosure.
Figure 10B:
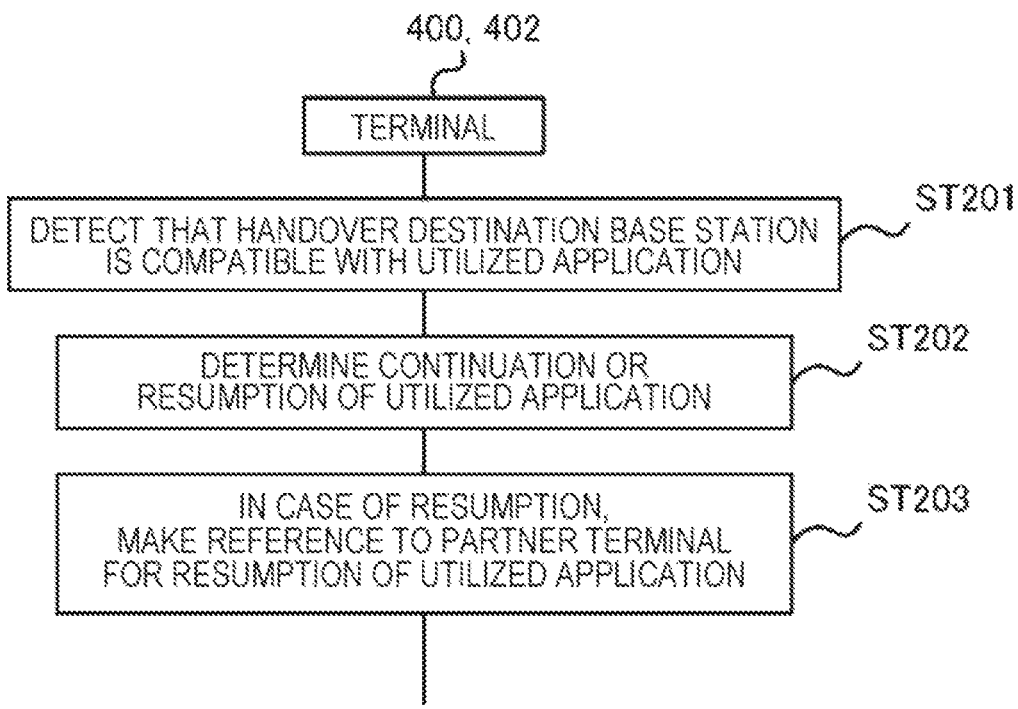
FIG. 10B is an example of a method for control of a utilized application during a handover according to the embodiment of the present disclosure.

FIGS. 10A and 10B show processes associated with a utilized application of the terminal 400 or 402 in a case where the terminal 400 or 402 is handed over to be brought under control of another base station 404 or 406.

First, the utilized application controller 507 of the terminal 400 or 402 obtains, on the basis of application compatibility information of the handover destination base station 404 or 406 (referred to, for example, as "target eNodeB"), information indicating whether the handover destination base station 404 or 406 is compatible with an application currently utilized by the terminal 400 or 402.

This information may be contained in RRC Connection Reconfiguration information that is transmitted from the handover origin base station 404 or 406 (referred to, for example, as "serving eNodeB") immediately before a handover or may be contained in System Information Block or MAC CE that is sent from the handover destination base station 404 or 406. Alternatively, depending on whether a header compression mode that the handover destination base station 404 or 406 utilizes is compatible with the application currently utilized by the terminal 400 or 402, the utilized application controller 507 may implicitly determine whether the handover destination base station 404 or 406 is compatible with the currently utilized application.

In a case of having detected that the handover origin base station 404 or 406 is compatible with the utilized application of the terminal 400 or 402 and the handover destination base station 404 or 406 is compatible with the utilized application of the terminal 400 or 402, too (step (ST) 201 of FIG. 10B), the terminal 400 or 402 determines to continue to utilize the utilized application (ST202 of FIG. 10B).

On the other hand, in a case of having detected that the handover origin base station 404 or 406 is compatible with the utilized application of the terminal 400 or 402 but the handover destination base station 404 or 406 is not compatible with the utilized application of the terminal 400 or 402 (ST101 of FIG. 10A), the terminal 400 or 402 determines to stop utilizing the utilized application or a part of an application function (such as ECN) (ST102 of FIG. 10A). Then, the terminal 400 or 402 notifies the communication partner terminal of utilized application control information indicating stoppage of a function of the utilized application (ST103 of FIG. 10A). Upon receiving the utilized application control information indicating stoppage of the function of the utilized application, the communication partner terminal stops utilizing ECN.

In a case where the utilization of ECN is stopped, for example, as a method for notification of utilized application function stoppage, the terminal 400 or 402 may configure the hitherto-used ECN bits at "00", which indicate ECN incompatibility, and transmit the ECN bits. The utilized application controller 507 of the communication partner terminal 400 or 402 that has received an IP packet whose ECN bits are "00" and the utilized application control information acquirer 606 of the base station 404 or 406 on the communication partner side stop utilizing ECN.

Further, before transmitting the ECN bits as "00", the utilized application controller 507 of the terminal 400 or 402 may transmit an SDP offer again to the communication partner terminal 400 or 402 and negotiate about stoppage of ECN through the SDP offer and an SDP answer.

The following describes an operation that is performed in a case where the terminal 400 or 402 has been handed over again with all or part (such as ECN) of a utilized application of the terminal 400 or 402 stopped once and has determined that the handover destination base station 404 or 406 is compatible with the utilized application.

In this case, the terminal 400 or 402 determines to resume the utilized application being stopped by the handover destination base station 404 or 406 (ST202 of FIG. 10B).

Then, the terminal 400 or 402 refers to the communication partner terminal 400 or 402 for resumption of the application that was utilized at the start of communication (ST203 of FIG. 10B). As a method for making a reference, for example, in the case of ECN, the terminal 400 or 402 may configure the ECN bits at "01" or "10", which indicate ECN compatibility, and transmit the ECN bits. In a case where resumption of ECN causes no problem, the utilized application controller 507 of the communication partner terminal 400 or 402 that has received an IP packet whose ECN bits are "01" or "10 configures the ECN bits at "01" or "10", which indicate ECN compatibility, and sends back the IP packet.

The case where resumption of ECN causes no problem means a case where the base station 404 or 406 currently connected on the side of the communication partner terminal 400 or 402 that has received an IP packet whose ECN bits have been configured at "01" or "10 is compatible with ECN, too.

On the other hand, in a case where the base station 404 or 406 currently connected on the side of the communication partner terminal 400 or 402 that has received an IP packet whose ECN bits have been configured at "01" or "10 is not compatible with ECN, i.e. a case where resumption of ECN causes a problem, the utilized application controller 507 of the communication partner terminal 400 or 402 configures the ECN bits at "00", which indicate ECN incompatibility, and sends back the IP packet.

In a case where the terminals 400 and 402 has negotiated with each other about resumption of ECN, the utilized application control information acquirer 606 of the base station 404 or 406 acquires ECN resumption information by receiving an IP packet whose ECN bits are "01" or "10". This causes the base station 404 or 406 to resume the function of ECN that has been stopped.

Further, before transmitting the ECN bits as "01" or "10", the utilized application controller 507 of the terminal 400 or 402 may transmit an SDP offer again to the communication partner terminal 400 or 402 and negotiate about resumption of ECN through the SDP offer and an SDP answer.

In this way, on the basis of an application with which the handover destination base station 404 or 406 is compatible, the terminal 400 or 402 controls continuation, stoppage, or resumption of an application to be utilized. This allows the terminal 400 or 402 to, without using an SDP offer or an SDP answer for each handover, negotiate with the communication partner terminal about utilization of the application on an established data path.

Effects of the Present Embodiment

As noted above, in the present embodiment, a terminal 400 or 402 acquires application compatibility information indicating an application with which a base station 404 or 406 located on a channel of communication with a communication partner terminal is compatible, negotiates with the communication partner terminal about utilization of an application, included in applications with which the terminal is compatible, that matches an application indicated by application compatibility information of the base station 404 or 406, and determines a header compression mode on the basis of the application about which negotiations have been conducted.

As a result, in a case where an ECN-incompatible base station is included among base stations 404 and 406 located on a channel of communication between terminals 400 and 402 that make ECN-based congestion notification, the terminals 400 and 402 do not negotiate with each other about utilization of ECN. This makes it possible to prevent a base station located on the channel of communication between the terminals 400 and 402 from omitting to transmit ECN bits in an IP header by applying such a high-compression mode as to omit the IP header.

Further, the terminal 400 or 402 and the base station 404 or 406 determine a header compression mode on the basis of the application (e.g. ECN) about which negotiations have been conducted. This makes it possible to, even in a case where an RoHC high-compression mode is applied, use a high-compression mode (see, for example, FIG. 9) with consideration given to notification of ECN bits. In other words, this makes it possible to prevent an RoHC compression mode from being changed to a low-compression mode regardless of ECN-based congestion notification.

Thus, the present embodiment makes it possible to appropriately apply a high-compression mode in an ECN-supporting environment. Further, since the present embodiment makes it possible to normally make ECN-based congestion notification in a high-compression mode, the present embodiment makes it possible to prevent frequent occurrences of congestion notification and reduce waste of radio resources.

OTHER EMBODIMENTS

ECN is not the only application that the terminals 400 and 402 utilize, but the terminals 400 and 402 may utilize another application.

Figure 11:
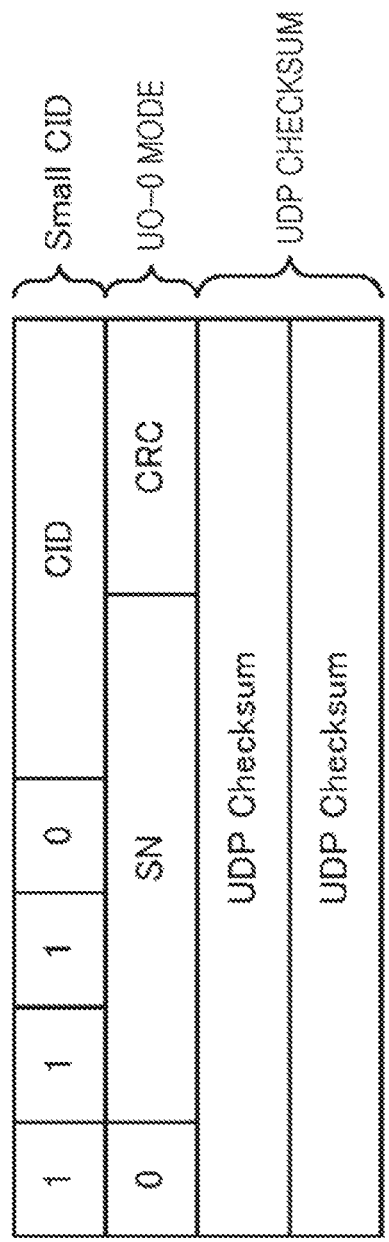
FIG. 11 is a diagram showing an example of a high-compression mode with respect to MMCMH according to another embodiment of the present disclosure.

For example, an efficient header compression mode can be utilized even when a scheme of the present disclosure is applied to MMCMH (Multi-stream Multiparty Conferencing for Multimedia Telephony Service for MTSI) described in 3GPP TS 26.114 v14.0.0, "IP Multimedia Subsystem (IMS); Multimedia telephony; Media handling and interaction" and 3GPP TR 26.980 v13.0.0, "Media handling aspects of multi-stream multiparty conferencing for Multimedia Telephony Service for IMS (MTSI)". FIG. 11 shows an example of an RoHC high-compression mode suitable for MMCMH utilization in VoLTE. MMCMH needs only be able to distinguish between a plurality of VoLTE flows (streams) in one session. Accordingly, it is only necessary, at the time of MMCMH utilization, to use such a high-compression mode as to include a CID (Context ID) described in IETF RFC 3095, "RObust Header Compression (ROHC): Framework and four profiles: RTP, UDP, ESP, and uncompressed", C. Bormann, Editor. For example, the base station 404 or 406 (compression mode determiner 605) may select a high-compression mode with the highest compression rate from among header compression modes having a field that transmits a CID. In using a CID, the terminal 400 or 402 and the base station 404 or 406 may use a method described in 3GPP TS 36.323 v13.2.1, "Evolved Universal Terrestrial Radio Access (E-UTRA); Packet Data Convergence Protocol (PDCP) specification" and 3GPP TS 36.331 v13.2.0, "Evolved Universal Terrestrial Radio Access (E-UTRA); Radio Resource Control (RRC); Protocol specification" to negotiate with each other about an upper limit (maxCID) to the CID according to the number of VoLTE flows to be used.

Further, the application compatibility information notifier 602 of the base station 404 or 406 may not only make notification of information on a supported application but also, depending on a condition of radio quality or the like, make notification of information on an unsupportable application. For example, in a case where congestion of the radio access network 408 or 410 or the like makes it difficult to allocate radio resources to video such as videophone while it is possible to allocate radio resources to a voice-only telephone call (VoLTE), the base station 404 or 406 may use the method shown in FIG. 7A or 7B to notify the terminal 400 or 402 that video is not supported or that video is temporarily unsupportable. At the start of communication, the utilized application negotiator 504 of the terminal 400 or 402 that has received this notification negotiates not about videophone but about a voice-only telephone call by not including a video-related media line in an SDP offer or answer. When the application compatibility information acquirer 502 of the terminal 400 or 402 has acquired information from the base station 404 or 406 to the effect that video is not supported or that video is temporarily unsupportable, information indicating that video is not available may be displayed on a screen or the like in order to notify a user of the terminal 400 or 402 that video is not available. Further, in a case where the handover destination base station 404 or 406 does not support video or becomes temporarily incapable of supporting video although videophone was utilized at the start of communication, the utilized application controller 507 of the terminal 400 or 402 uses UE requested bearer resource modification or the like described in 3GPP TS 23.401 v14.0.0, "General Packet Radio Service (CPRS) enhancements for Evolved Universal Terrestrial Radio Access Network (E-UTRAN) access" to stop video utilization by a method such as releasing resources allocated to a video bearer. As for resumption of video utilization, it is similarly possible to apply a method of reallocating resources to a video bearer. Further, the methods of releasing and reallocating bearer resources may not be used, and stoppage and resumption of video may be performed by exchanging an SDP offer and an SDP answer and renegotiating with the communication partner terminal 400 or 402. At the time of stoppage and resumption of video, a method of making a display on the screen or making a sound may be used to notify the user of the terminal 400 or 402.

Further, although the foregoing embodiment has described a method for selecting an efficient header compression scheme for an application and the properties of the application in an LTE network, application of the scheme of the present disclosure is not limited to the LTE network. For example, the scheme of the present disclosure may be applied to a next generation network such as that described in 3GPP TR 23.799 v0.6.0, "Study on Architecture for Next Generation System". In this case, what a bearer is to the LTE network may be what a slice is to the next generation network.

Further, an aspect of the present disclosure is not limited to any of the embodiments described above and can be carried out in various modifications.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit having an input terminal and an output terminal. Further, the integrated circuit may control each functional block used in the description of each embodiment described above and include an input terminal and an output terminal coupled thereto. These LSIs may be individually formed as one chip, or one chip may be formed so as to include a part or all of the functional blocks. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

A terminal of the present disclosure includes: an acquirer that acquires first application compatibility information indicating an application with which a base station located on a channel of communication with a communication partner terminal is compatible; a negotiator that negotiates with the communication partner terminal about utilization of an application, included in applications with which the terminal is compatible, that matches the application indicated by the first application compatibility information; and a compression mode determiner that determines a compression mode on the basis of a result of negotiations about the application.

The terminal of the present disclosure further includes a first notifier that notifies the base station of second application compatibility information indicating the application, included in the application with which the terminal is compatible, that matches the application indicated by the first application compatibility information.

The terminal of the present disclosure further includes a second notifier that notifies the base station of utilized application information indicating an application whose utilization has been determined by the negotiator.

The terminal of the present disclosure further includes a controller that, in a case where the terminal is handed over, determines stoppage or continuation of a currently utilized application on the basis of information on an application with which a handover destination base station is compatible.

In the terminal of the present disclosure, in a case where, after the application has been stopped, the terminal is handed over to a base station that is compatible with the application, the controller resumes utilization of the application.

In the terminal of the present disclosure, the application is ECN Explicit Congestion Notification, and the compression mode determiner selects a mode with a highest compression rate from among modes having a field that transmits notification bits of ECN.

In the terminal of the present disclosure, the field that transmits notification bits of ECN is a ToS (Type of Service) field or a Traffic Class field.

In the terminal of the present disclosure, the application is MMCMH (Multi-stream Multiparty Conferencing for Multimedia Telephony Service for MTSI), and the compression mode determiner selects a mode with a highest compression rate from among mode having a field that transmits a CID (Context ID).

A base station of the present disclosure includes: a notifier that notifies a terminal of first application compatibility information indicating an application with which the base station is compatible; an application information acquirer that acquires information on an application about which the terminal has negotiated with its communication partner on the basis of the first application compatibility information; and a compression mode determiner that determines a compression mode on the basis of the information thus acquired on the application about which negotiations have been conducted.

A communication method of the present disclosure includes: acquiring first application compatibility information indicating an application with which a base station located on a channel of communication between a terminal and a communication partner terminal is compatible; negotiating with the communication partner terminal about utilization of an application, included in applications with which the terminal is compatible, that matches the application indicated by the first application compatibility information; and determining a compression mode on the basis of a result of negotiations about the application.

A communication method of the present disclosure includes: notifying a terminal of first application compatibility information indicating an application with which a base station is compatible; acquiring information on an application about which the terminal has negotiated with its communication partner on the basis of the first application compatibility information; and determining a compression mode on the basis of the information thus acquired on the application about which negotiations have been conducted.

The present disclosure is suitable, for example, for a communication system that selects an efficient header compression scheme for an application to be used in communications and the properties of the application.

What is claimed is:

1. A terminal comprising:
   a receiver, which, in operation, receives first application compatibility information indicating an application in which a base station located on a channel of communication with a communication partner terminal is compatible;
   circuitry, which, in operation,
      negotiates with the communication partner terminal about utilization of an application, included in applications in which the terminal is compatible, that matches the application indicated by the first application compatibility information, and
      determines a compression mode on the basis of a result of negotiations about the application; and
   a transmitter, which, in operation, notifies the base station of utilized application information indicating an application whose utilization has been negotiated with the communication partner terminal.

2. The terminal according to claim 1, wherein the transmitter, in operation, notifies the base station of second application compatibility information indicating the application, included in the applications in which the terminal is compatible, that matches the application indicated by the first application compatibility information.

3. The terminal according to claim 1, wherein the circuitry, in operation and in a case where the terminal is handed over, determines stoppage or continuation of a current application on the basis of information on an application which a handover destination base station is compatible.

4. The terminal according to claim 3, wherein, in a case where, after the current application has been stopped, the terminal is handed over to a base station that is compatible with the current application, the circuitry resumes utilization of the current application.

5. The terminal according to claim 1, wherein the application is an ECN (Explicit Congestion Notification), and the circuitry, in operation, selects a mode with a highest compression rate from among modes having a field that transmits notification bits of ECN.

6. The terminal according to claim 5, wherein the field that transmits notification bits of ECN is a ToS (Type of Service) field or a Traffic Class field.

7. The terminal according to claim 1, wherein the application is a MMCMH (Multi-stream Multiparty Conferencing for Multimedia Telephony Service for MTSI), and the circuitry, in operation, selects a mode with a highest compression rate from among mode having a field that transmits a CID (Context ID).

8. A base station comprising:
a transmitter, which, in operation, notifies a terminal of first application compatibility information indicating an application in which the base station is compatible;
a receiver, which, in operation, receives information on an application about which the terminal has negotiated with a communication partner terminal on a basis of the first application compatibility information; and
circuitry, which, in operation, selects a compression mode on a basis of the information on the application about which the terminal has negotiated with the communication partner terminal,
wherein, in a case where the application is an ECN (Explicit Congestion Notification), the circuitry selects a compression mode with a highest compression rate from among modes having a field that transmits notification bits of ECN.

9. A communication method comprising:
receiving first application compatibility information indicating an application in which a base station located on a channel of communication between a terminal and a communication partner terminal is compatible;
negotiating with the communication partner terminal about utilization of an application, included in applications in which the terminal is compatible, that matches the application indicated by the first application compatibility information;
determining a compression mode on the basis of a result of negotiations about the application; and
notifying the base station of second application compatibility information indicating the application, included in the applications in which the terminal is compatible, that matches the application indicated by the first application compatibility information.

10. A communication method comprising:
notifying a terminal of first application compatibility information indicating an application in which a base station is compatible;
receiving information on an application about which the terminal has negotiated with a communication partner terminal on a basis of the first application compatibility information; and
selecting a compression mode on a basis of the information on the application about which the terminal has negotiated with the communication partner terminal,
wherein, in a case where the application is a MMCMH (Multi-stream Multiparty Conferencing for Multimedia Telephony Service for MTSI), a compression mode with a highest compression rate from among mode having a field that transmits a CID (Context ID) is selected.

* * * * *